United States Patent Office 3,028,379
Patented Apr. 3, 1962

3,028,379
PROCESS FOR THE PRODUCTION OF
6-AMINO-PENICILLANIC ACID
John C. Sheehan, Cambridge, Mass.
(10 Moon Hill Road, Lexington 73, Mass.)
No Drawing. Filed Oct. 23, 1959, Ser. No. 848,202
5 Claims. (Cl. 260—239.1)

This invention relates to the production of 6-aminopenicillanic by either partial or totally synthetic routes. More particularly this invention relates to methods for producing 6-aminopenicillanic acid from D-α-4-carbomethoxy-5,5-dimethyl-α-amino - 2 - thiazolidineacetic acid of the formula:

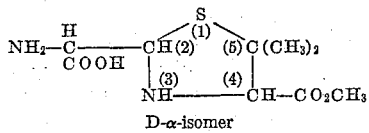

D-α-isomer and the acid addition salts thereof; such as, for example, the hydrochloride. The foregoing name and structural formula represents the common and accepted nomenclature and it will be noted that, in addition to the identification thereof as the D-α-isomer, the carbon atom of the acetic acid moiety attached to the 2-position of the thiazolidine ring is designated as the α-position in this structure.

The compound, 6-aminopenicillanic-acid having the structure;

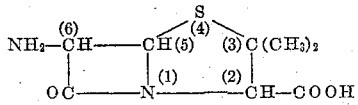

has great commercial value as a starting material in the production of natural and synthetic penicillins. At this time, 6-aminopenicillanic acid is commercially produced by isolating it from penicillin fermentation broths, as was reported by F. R. Batchelor, F. P. Doyle, J. H. C. Nayles and G. N. Robinson, Nature 183, 257 (1959). This present method of producing 6-aminopenicillanic acid involves the use of a plurality of steps which make the cost of production expensive. More importantly, the production of 6-aminopenicillanic acid in penicillin fermentation processes and the isolation thereof from the fermentation broths requires extremely careful control of the process and, in the absence thereof, the 6-aminopenicillanic acid is rapidly degraded and the yield of this product is so low as to render the process uneconomical.

The foregoing disadvantages of the present method for producing 6-aminopenicillanic acid are overcome by this invention which comprises preparing this acid from D-α-4-carbomethoxy - 5,5 - dimethyl - α - amino - 2 - thiazolidine acetic acid and the acid addition salts thereof, which starting material may be prepared at relatively low cost and in large quantities either by a totally synthetic route, as described by J. C. Sheehan and K. R. Henery-Logan, J.A.C.S. 81, 3089 (1959), or from penicillin G. This invention comprises, briefly stated, tritylation of D-α-4-carbomethoxy - 5,5 - dimethyl - α - amino-2-thiazolidine-acetic acid or its acid addition salt, cyclization with an aliphatic monocarbodiimide to form methyl-6-tritylaminopenicillanate which is then selectively saponified to provide 6-tritylaminopenicillanic acid that is, in turn, detritylated with dilute hydrochloric acid to provide crystalline 6-aminopenicillanic acid. It has also been found that 6-tritylaminopenicillanic acid may be detritylated by hydrogenolysis employing 30 percent palladium on a carbon support as a catalyst.

It is, therefore, the principal object of this invention to provide a method for producing 6-aminopenicillanic acid which is simple to carry out and which does not require careful controls. Another object of this invention is to provide a method for producing 6-aminopenicillanic acid from materials which are low in cost and which are readily available in large quantities. Still another object of this invention is to provide a method for preparing 6-aminopenicillanic acid from D-α-4-carbomethoxy-5,5-dimethyl-α-amino-2-thiazolidine acetic acid and the acid addition salts thereof which may be inexpensively produced synthetically or from penicillin G. It is a further object of this invention to provide a method for tritylating D-α-4-carbomethoxy-5,5-dimethyl - α - amino-2-thiazolidine acetic acid or the hydrochloride salt thereof, cyclizing the product thus obtained with a monocarbodiimide to provide a penicillanate; and, thereafter, selectively saponifying and detritylating to form 6-aminopenicillanic acid. The foregoing and other objects of this invention will appear from the following detailed description of this invention.

This invention may be carried out either by means of a partial synthesis route or a total synthesis. The partial synthesis route is preferable because it employs penicillin G which is a low cost material that is available in large quantities. This partial synthesis route involves adding hydrogen chloride gas to a cool solution prepared by storage for 24 hours of sodium benzyl penicillinate in methanol containing a small amount of triethylamine and obtaining an aqueous extract of the reaction mixture which is neutralized with an alkali metal carbonate and extracted with methylene chloride. From the latter extract is obtained a basic material which may be dissolved in acetone, acidified with hydrogen chloride. Upon the addition of ether to this solution, a crystalline precipitate of methyl D-α-4-carbomethoxy - 5,5 - dimethyl-α-amino-2-thiazolidineacetate hydrochloride forms. The α-methyl ester grouping of this compound is saponified with one equivalent of sodium hydroxide to form D-α-4-carbomethoxy-5,5 - dimethyl-α-amino - 2 - thiazolidine-acetic acid which is then tritylated by the method described by L. Zervas and D. M. Theodoropoulos, J.A.C.S. 78, 1359 (1956), to form D-α-4-carbomethoxy-5,5-dimethyl - α - tritylamino-2-thiazolidineacetic acid. This product is cyclized with N,N¹-diisopropylcarbodiimide by a modification of the method described by J. C. Sheehan and G. P. Hess, J.A.C.S. 77, 1067 (1955), to form methyl-6-tritylaminopenicillanate. This methyl ester is then selectively saponified to form 6-tritylaminopenicillanic acid which is then detritylated with dilute hydrochloric acid to form 6-aminopenicillanic acid.

In carrying out this invention with the total synthesis series, the compound, t-butyl D-α-4-carbomethoxy-5,5-dimethyl-α-phthalimodo-2-thiazolideneacetate is prepared by the method described by J. C. Sheehan and K. R. Henery-Logan, J.A.C.S. 81, 3089 (1959), and the phthaloyl group is removed therefrom by the method described for the corresponding DL-isomer by J. C. Sheehan and P. A. Cruickshank, J.A.C.S. 78, 3677 (1956), to produce t-butyl D - α - 4-carbomethoxy-5,5-dimethyl-α-amino-2-thiazolidineacetate hydrochloride. Cleavage of the t-butyl ester with hydrogen chloride produced the dihydrochloride of D-α-4-carbomethoxy-5,5-dimethyl-α-amino-2-thiazolidineacetic acid. Trityl chloride and diethylamine by the method described by L. Zervas and D. M. Theodoropoulos, J.A.C.S. 78, 1359 (1956), converted this into D-α-4-carbomethoxy-5,5-dimethyl-α-tritylamino-2-thiazolidineacetic acid. Treatment of the latter compound with N,N¹-diisopropylcarbodiimide in dioxane-water by the method described by J. C. Sheehan and G. P. Hess, J.A.C.S. 77, 1067 (1955), followed by chromatography over neutral alumina provided crystalline methyl-6-tritylaminopenicillanate. This compound may be selectively saponified and detritylated in the manner described in the partial synthesis route above, to provide 6-aminopenicillanic acid or, in the alternative, hydrogenolysis may be employed in the detritylation.

The crystalline 6-aminopenicillanic acid product obtained by either the total synthesis series and the partial synthesis route, above described, $C_8H_{12}N_2O_3S$, gave M.P. 207–208° C. (dec.) [natural 208–209° C. (dec.)], undepressed mixed M.P. with natural, $\alpha^{31}D$ +273° (c. 1.2 in 0.1 N hydrochloric acid) [calculated C. 44.4; H, 5.6; N, 13.0; S, 14.8 percent; found C, 44.43; H, 5.54; N, 12.86 percent]. The infrared spectra (KBr) of natural and synthetic 6-aminopenicillanic acid were identical. Acylation of the synthetic 6-aminopenicillanic acid produced by the above described methods with phenylacetyl chloride in aqueous acetone containing sodium bicarbonate gave penicillin G and penicillin V was prepared therefrom by phenoxyacetylation. The identity of these synthetic penicillins G and V with the corresponding penicillin salts obtained directly by fermentation was established by infrared spectra (KBr), M.P. and mixed M.P., optical rotation and microbiological assay.

The methods comprising this invention are especially unique by virtue of the properties of the compounds D-$\alpha$-4-carbomethoxy - 5,5-dimethyl-$\alpha$-amino-2-thiazolidineacetic acid and the acid addition salts thereof which are essential to the production of 6-aminopenicillanic acid by either the partial synthesis route or the total synthesis series hereinabove described. These compounds must, as has been shown above, be cyclized to form an amide bond and, in forming the latter, produce the $\beta$-lactam structure which is now accepted as being characteristic of the penicillins. In the cyclization of D-$\alpha$-4-carbomethoxy-5,5-dimethyl - $\alpha$ - amino-2-thiazolidineacetic acid, it is desirable to protect the $\alpha$-amino grouping. It has been found that nearly all the blocking means which are known and used in such circumstances in the art of forming peptide bonds are not applicable to this invention. The objection to such known expedients arises in the removal of the blocking or protecting moiety from the molecule after the cyclization step has been completed. It has been found that in practically all instances, the removal of the protecting group is accompanied by destruction of the ring structure; and, particularly the $\beta$-lactam grouping, either substantially completely or to such a great extent the process involved is rendered substantially useless, commercially. It is, therefore, quite unexpected that the trityl portion of the $\alpha$-tritylamino grouping which protects the $\alpha$-amino-group may be removed without causing substantially complete destruction of the $\beta$-lactam grouping.

The best embodiments for carrying out the above-described methods comprising this invention are set forth hereinbelow.

EXAMPLE I

The Partial Synthesis Route (A) *Methyl D - α - 4 - carbomethoxy-5,5-dimethyl-α-amino-2-thiazolidine acetate hydrochloride.*—A solution of 10 g. (0.03 mole) of sodium benzyl penicillinate in 100 ml. of methanol containing 0.5 ml. of triethylamine was stored at room temperature for 24 hours. To the cooled (0–5° C.) mixture, 36 g. of hydrogen chloride gas was added slowly and the reaction was allowed to proceed at room temperature for five days. Concentration under reduced pressure afforded a red oil, which was taken up in 25 ml. of water and extracted with four 15 ml. portions of methylene chloride. The aqueous layer was neutralized to pH 7 with sodium carbonate and extracted with four 20 ml. portions of methylene chloride to yield 3.24 g. of basic material. This was dissolved in 10 ml. of acetone and acidified to pH 1.5 with hydrogen chloride in 2 ml. of methanol. Crystallization was effected by the addition of ether to the cloud point to yield a total of 1.81 g. of product, M.P. 172–173° C.

A sample was recrystallized for analysis from ether-methanol, M.P. 174–175° C. (dec.), $\alpha_D^{25}$ +104° (c., 1.34 in methanol). *Analysis.*—Calculated for $C_{10}H_{19}ClN_2O_4S$ C, 40.20; H, 6.41; N, 9.37. Found C, 40.28; H, 6.38; N, 9.34.

(B) *D-α-4-carbomethoxy-5,5-dimethyl-α-tritylamino-2-thiazolidineacetic acid.*—6 g. of methyl D-α-4-carbomethoxy-5,5-dimethyl-α-amino - 2 - thiazolidineacetate hydrochloride was slowly dissolved in 10 ml. of water. The α-methyl ester grouping was saponified by adding one equivalent of sodium hydroxide, 10 ml. 2 N, quickly. A second equivalent of sodium hydroxide, 10 ml. 2 N, was added dropwise over 10 minutes and the solution was left at room temperature for 20 minutes. One equivalent of hydrochloric acid, 20 ml. 1 N, was added (pH 4) to provide a solution of D-α-4-carbomethoxy-5,5-dimethyl-α-amino-2-thiazolidineacetic acid. To this solution was added 5.58 g. of trityl chloride in about 15 portions over a period of 30 minutes with vigorous stirring. A solid started precipitating out at the end of the additions. The mixture was stirred another 15 minutes at room temperature. Thereafter, 360 ml. of water was added and the precipitate filtered off. The cloudy filtrate was cooled to 1.5° C. over a period of 2 hours and 22 ml. of 2 N acetic acid was added dropwise until the pH of 6 was reached. The white solid formed was filtered off and washed with water twice and dried. Yield 2.02 g.

A 1.92 g. portion of this product was dissolved in 200 ml. of ether, washed with 400 ml. of pH 5.5 phosphate buffer (0.15 M) and then with 400 ml. of water. The product was then extracted with three 800 ml. portions of potassium bicarbonate (1.0%). The bicarbonate layers were combined and covered with 1 l. of ether and acidified to pH 6 with 100 ml. of 10 percent phosphoric acid. This was further extracted with 500 ml. of ether. The ether layers were combined, washed with 100 ml. of water, dried over magnesium sulfate, and concentrated to dryness. The lyophilized product gave, M.P. 87–89° C. (dec.); $[\alpha]_D^{31}$ +45.4° (c. 1.3 n-butyl acetate). *Analysis.*—Calculated for $C_{28}H_{30}N_2O_4S$: C, 68.55; H, 6.16; N, 5.71. Found C, 68.74; H, 6.28; N 5.55.

(C) *Methyl-6-tritylaminopenicillanate.*—To a cooled (3°) solution of 1.47 g. of D-α-4-carbomethoxy-5,5-dimethyl-α-tritylamino-2-thiazolidineacetic acid in 40 ml. of dioxane and 20 ml. of water was added in one portion a solution of 474 mg. of N,N¹-diisopropylcarbodiimide in 30 ml. of dioxane. The solution was stirred in an ice bath for 30 minutes and then at room temperature (29°) for 70 minutes. The solution was then lyophilized. A 1.56 g. portion of this product was dissolved in benzene and passed through neutralized alumina column and the first fraction was taken up in 5 ml. of ether, to which 5 ml. of petroleum ether was added. This was cooled overnight at 5° C., the supernatant liquid decanted off and the remaining liquid washed three times with a mixture of equal amounts of ethyl alcohol and petroleum ether. This was concentrated to one-half volume in a nitrogen stream and the crystalline solid that formed was recovered. This gave M.P. 165–166° C.; $\alpha_D^{31}$ +96° (c. 1.1 in n-butylacetate);

$\lambda_{max}^{KBr}$ at 5.63 (vs) $\mu$

Calculated $C_{28}H_{28}N_2O_3S$: C, 71.17; H, 5.97; N, 5.93. Found C, 71.29; H, 6.07; N, 5.73.

(D) *6-tritylaminopenicillanic acid.*—To a solution of 2.48 g. of methyl-6-tritylaminopenicillanate in 100 ml. of ice-cold reagent pyridine was added, with vigorous stirring, 10.5 ml. of 0.5 N sodium hydroxide in 100 ml. of ice-cold water. The solution was stirred for 1.5 hours in an an ice-bath and then covered with 500 ml. ether and 10% $H_3PO_4$ was added until a pH of 5.5 was reached (17 ml. required). The water layer was extracted with an additional 500 ml. of ether and the combined organic layers were washed with 500 ml. phosphate buffer (pH 5.5; 0.15

M) and 500 ml. of water. The water layers were discarded. The organic layer was extracted with three 500 ml. portions of 1% potassium bicarbonate countercurrent to 1000 ml. and 900 ml. portions of ether. The 150 ml. of 1% potassium bicarbonate extract were cooled in an ice-bath and covered with 1 l. of cold ether and 140 ml. of 10% phosphoric acid was added to adjust the pH to 5.5. A 200 ml. portion of 0.15 M phosphate buffer, pH 5.5 was added. After separation the aqueous layer was extracted with an additional 300 ml. of ether. The combined ether layers were washed with 300 ml. of water (which was discarded) and the ether layer dried over magnesium sulfate; filtered and concentrated to dryness. This was taken up in 30 ml. of benzene and lyophilized. A 485 mg. portion of this product was dissolved in ether and 1.10 moles of diethylamine was added. This was cooled at 5° C. for 4.5 hours, filtered and washed with two portions of ether. The precipitated solid was dissolved in 5 ml. of dioxane, filtered, 40 ml. of ether added and the solution cooled at 5° C. The crystalline precipitate was filtered off and washed with three portions of ether. This gave $C_{31}H_{37}N_3O_3S$; M.P. 166–168° C. (dec.); $\alpha_D^{29}$ +89° (c. 1 in dioxane)

$\lambda_{max.}^{KBr}$ at 5.66 (vs) $\mu$

*Analysis:* Calculated C, 70.03; H, 7.02; N, 7.90. Found C, 69.71; H, 7.00; N, 7.90.

(E) *6-aminopenicillanic acid.*—A 974 microgram portion of 6-tritylaminopenicillanic acid was dissolved in 16 ml. of isopropanol and 4 ml. of 1 N hydrochloric acid added. After standing 23 hours, this solution was partitioned between 400 ml. of benzene and 100 ml. of water. The aqueous layer was extracted with 20 ml. of n-butanol and 20 ml. of 0.2 N lithium hydroxide was added. This was re-extracted with n-butanol and the aqueous phase concentrated at room temperature and 0.2 mm. to a volume of 11.4 ml. The crystalline precipitate formed was removed. The solution was further concentrated at room temperature and 0.5 mm. to a volume of 3.2 ml. A second crop of crystals was recovered and both crops were combined. This was dissolved in one-fourth ml. of 1 N hydrochloric acid and 1.5 ml. of water, and then treated with carbon and Celite. The colorless solution was filtered and one-fourth ml. of 1 N lithium hydroxide added. This was cooled to 5° C. overnight and a crystalline compound was recovered which gave an M.P. of 207–208° C. (dec.) [natural 208–209° C. (dec.)]; undepressed mixed M.P. with natural; $\alpha_D^{31}$ +273° (C. 1.2 in 0.1 N hydrochloric acid). *Analysis:* Calculated C, 44.44; H, 5.60; N, 12.96. Found: C, 44.43; H, 5.54; N, 12.86.

EXAMPLE II

*Total Synthesis Route*

(A) *D-α-4-carbomethoxy-5,5-dimethyl-α-amino-2-thiazolidineacetic acid dihydrochloride.*—This compound is produced by cleavage of the t-butyl ester grouping from t-butyl D-α-4-carbomethoxy-5,5-dimethyl-α-amino-2-thiazolidineacetate hydrochloride which is obtained by removal of the phthaloyl group from t-butyl D-α-4-carbomethoxy-5,5-dimethyl-α-phthalimido-2-thiazolidineacetate, the preparation of which is described by J. C. Sheehan and K. R. Henery-Logan, J.A.C.S. 81, 3089 (1959), by treating the latter compound in the manner described for the corresponding DL-isomer by J. C. Sheehan and P. A. Cruickshank J.A.C.S. 78, 3677 (1956), the contents of which publications are incorporated herein by reference. The cleavage of the t-butyl grouping is carried out by suspending 500 mg. of t-butyl D-α-4-carbomethoxy-5,5-dimethyl-α-amino-2-thiazolidineacetate hydrochloride in 20 ml. of dry nitromethane and cooling the solution to 0° C. Hydrogen chloride gas is then passed into the cooled suspension which caused the solids to go into solution. The solution was kept at 5° C. for 10 minutes, then concentrated and washed twice with 3 ml. of nitromethane. The product obtained $C_9H_{18}N_2O_4SCl_2$ gave M.P. 94–97° C. (dec.), $\alpha_D^{29}$ +82° (c. 0.5 in 6 N hydrochloric acid). Calculated: C, 33.66; H, 5.65; N, 8.73. Found: C, 33.72; H, 5.88; N, 8.93.

This product is then substituted in section B of Example I for the D-α-4-carbomethoxy-5,5-dimethyl-α-amino-2-thiazolidineacetic acid and tritylated as described in that example. The procedure described in sections C–E, inclusive, are thereafter carried out to produce 6-aminopenicillanic acid.

*Preparation of Penicillins*

(A) *N-ethylpiperidine salt of penicillin G.*—A solution of 216 mg. of 6-aminopenicillanic acid prepared by Example I, above, in 7 ml. of 4 percent potassium bicarbonate and 6 ml. of acetone was prepared and stirred in an ice bath. A solution of 175 mg. of phenylacetyl chloride in 3 ml. of acetone was prepared and added dropwise over a period of 10 minutes to the solution of 6-amino-penicillanic acid. The solution thus obtained was stirred an additional 30 minutes and the acetone was then removed on a rotating evaporator. The resulting solution was washed with 15 ml. of ether and then chilled in an ice bath. It was then layered with 10 ml. of ether and acidified to pH 2.5 by adding a 10 percent solution of phosphoric acid dropwise (47 drops required). The ether layer was separated and the aqueous layer washed with a second 10 ml. portion of ether. The ether layers were combined, washed with 5 ml. of water, dried rapidly over magnesium sulfate and filtered. A solution of 137 mg. of N-ethylpiperidine in 5 ml. of ether was then added and a colorless precipitate formed instantaneously, which resisted attempts to dissolve it by the addition of 12 ml. of acetone. This was stored overnight at 5° C. and the white crystalline solid was collected, washed with 3 portions of 2 ml. of ether and dried. The compound gave an M.P. 155–157° (dec.), $C_{23}H_{33}N_3OS$. Calculated: C, 61.71; H, 7.43; N, 9.39. Found: C, 61.44; H, 7.36; N, 9.46.

(B) *Penicillin V, potassium salt.*—A solution of 216 mg. 6-aminopenicillanic acid prepared by Example I, above, in 7 ml. of 4 percent potassium bicarbonate and 6 ml. of acetone was prepared and stirred in an ice bath. A solution of 200 mg. of phenoxyacetyl chloride in 3 ml. of acetone was prepared and added dropwise over a period of 10 minutes. The solution thus obtained was stirred at room temperature for an additional 30 minutes. This solution was shaken with one 35 ml. portion of benzene and one 15 ml. portion of ether, cooled and covered with 15 ml. of ether. The solution was adjusted to pH 2.5 by adding 10 percent phosphoric acid dropwise (17 drops required), and separated. The aqueous layer was extracted with two 5 ml. portions of ether. The ether portions (25 ml.) were combined, washed with 5 ml. cold water and 20 ml. of water was then added. The solution was adjusted to pH 7.2 by adding 11.7 ml. of 1 N potassium hydroxide, concentrated to a volume of 8 ml. and lyophilized. The product gave M.P. 252–254° C. (dec.).

The identity of the synthetic samples obtained as described above with the corresponding penicillin salts obtained directly by fermentation was established rigorously by infrared spectra (KBr), M.P. and mixed M.P., optical rotation and microbiological assay.

I claim:

1. The method of producing synthetic 6-amino-penicillanic acid which comprises tritylating a compound selected from the group consisting of D-α-4-carbomethoxy-5,5-dimethyl-α-amino-2-thiazolidineacetic acid and the acid addition salts thereof by contacting said compound with a trityl halide, cyclizing the D-α-4-carbomethoxy-5, 5-dimethyl-α-tritylamino-2-thiazolidineacetic acid thus formed by contact with a lower alkyl monocarbodiimide removing the methoxy function of the carbomethoxy grouping from the compound thus formed by saponification and subsequently detritylating the 6-tritylamino-penicillin compound.

2. The method of producing synthetic 6-aminopenicillanic acid which comprises tritylating a compound selected from the group consisting of D-α-4-carbomethoxy-5,5-dimethyl-α-amino-2-thiazolidineacetic acid and the acid addition salts thereof by contacting said compound with a trityl halide, cyclizing the D-α-4-carbomethoxy-5,5-dimethyl-α-tritylamino-2-thiazolidineacetic acid thus formed by contact with a lower alkyl monocarbodiimide, selectively saponifying the methyl 6-tritylamino-penicillanate thus formed to remove the methoxy function of the 2-carbomethoxy grouping, detritylating the 6-tritylaminopenicillanic acid thus formed and recovering 6-aminopenicillanic acid.

3. The method of claim 2 wherein said acid addition salt is an hydrochloride.

4. The method of claim 2 wherein said detritylation step comprises reacting 6-tritylaminopenicillanic acid with a weakly acid solution of a mineral acid.

5. The method of producing synthetic 6-aminopenicillanic acid which comprises reacting a compound selected from the group consisting of D-α-4-carbomethoxy-5,5-dimethyl-α-amino-2-thiazolidineacetic acid and the acid addition salts thereof with trityl chloride, cyclizing the D-α-4-carbomethoxy-5,5-dimethyl-α-tritylamino-2-thiazolidineacetic acid thus formed with N,N¹-diisopropylcarbodiimide, selectively saponifying the methyl 6-tritylaminopenicillanate thus formed with an alkali metal hydroxide to remove the methoxy function from the 2-carbomethoxy grouping, reacting the 6-tritylaminopenicillanic acid thus formed with a weakly acid solution of hydrochloric acid to detritylate said last-named compound, and recovering synthetic 6-aminopenicillanic acid.

References Cited in the file of this patent

Karrer: Organic Chemistry, pages 70–71, 2nd English ed. (1946).

Bergman: The Chemistry of Acetylene and Related Compounds, page 80, Interscience Publishers Inc., 1948.

Fieser et al.: Organic Chemistry, pages 180–81, 2nd ed. (1950).

Zervas et al.: Jour. Amer. Chem. Soc., vol. 78, pages 1359–63 (1956).

Sheehan et al.: Jour. Amer. Chem. Soc., vol. 79, pages 1262–63 (1957).